UNITED STATES PATENT OFFICE.

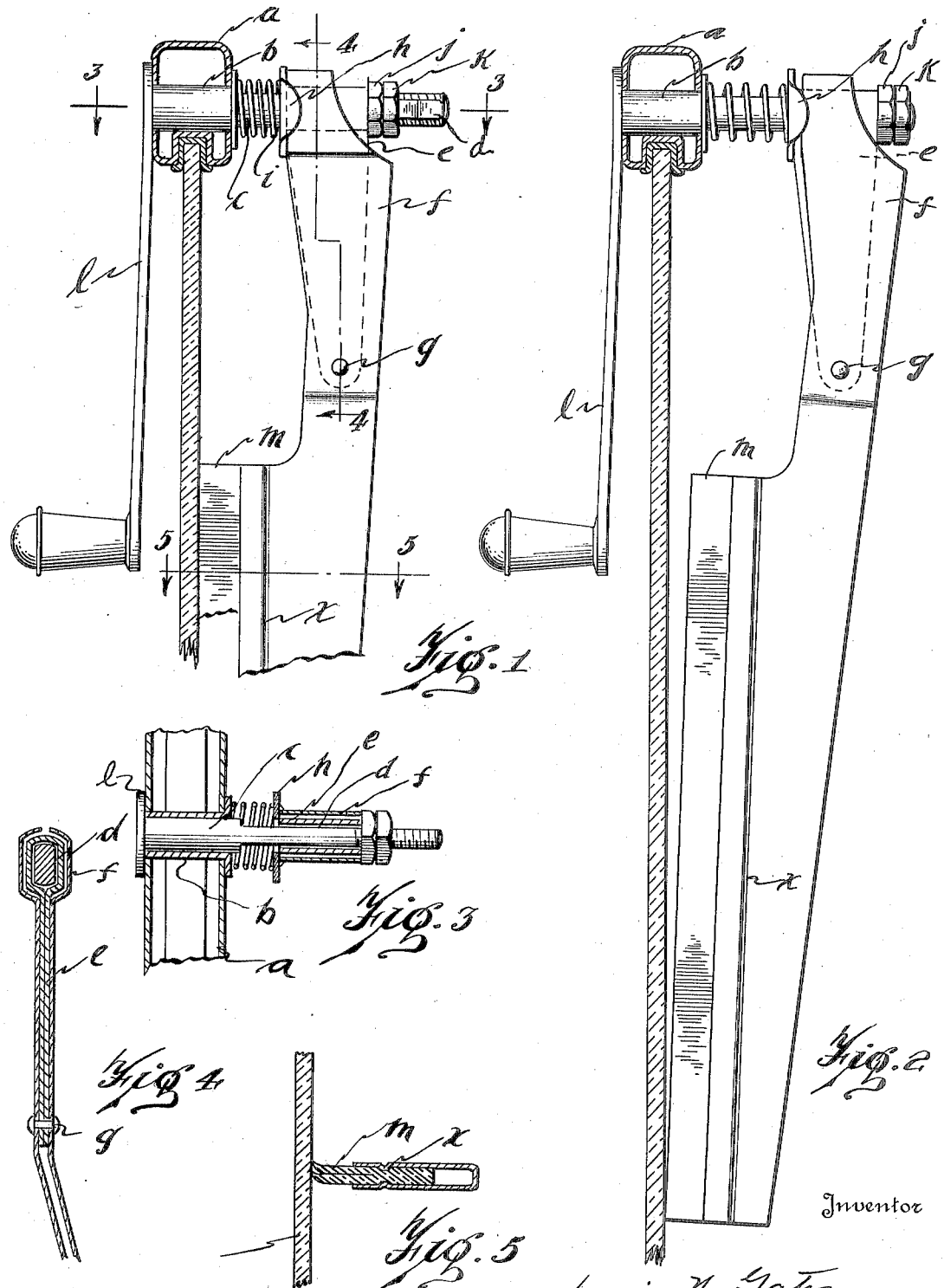

LOUIS W. GATES, OF DETROIT, MICHIGAN, ASSIGNOR TO TERNSTEDT MANUFACTURING COMPANY, OF DETROIT, MICHIGAN, A CORPORATION OF MICHIGAN.

WINDSHIELD-WIPER.

1,345,541.   Specification of Letters Patent.   Patented July 6, 1920.

Application filed March 8, 1920. Serial No. 364,169.

*To all whom it may concern:*

Be it known that I, LOUIS W. GATES, a citizen of the United States, residing at Detroit, in the county of Wayne and State of Michigan, have invented certain new and useful Improvements in Windshield-Wipers, of which the following is a specification.

This invention relates to windshield wipers, and has for its object a windshield wiper that can be accurately adjusted to a pane or slab of glass and that can be secured to the windshield frame and accurately adjusted to the pane of glass although conditions may vary in various windshields. It is also provided with suitable pressure means to keep the wiper to the glass.

In the drawings,—

Figure 1 is a fragmentary section through the windshield panel showing the wiper adjusted to the glass.

Fig. 2 is a cross section of a windshield panel showing the wiper when it is first placed in position and before it has been adjusted to the glass.

Fig. 3 is a section on the line 3—3 of Fig. 1.

Fig. 4 is a section on the line 4—4 of Fig. 1.

Fig. 5 is a section on the line 5—5 of Fig. 1.

Windshields vary considerably in dimensions of the frames and the planes of the glass panels are not always uniform. Consequently most windshield wipers are not very well calculated to accurately fit the average run of windshields. It is the object of the present invention to obviate this difficulty by adjusting the wiping element to the pane.

*a* designates the windshield panel frame, which is bored to receive a collared bushing *b* and the spindle *c*. This spindle is flattened as at *d* to receive a wiper carrier or a key *e* in the form of a folded strip adapted to lie closely contiguous to the flattened portion of the spindle as shown in Fig. 4. Over this fits the channeled arm *f* carrying the wiper arm. A pin *g* pivots the wiping element on the sliding key *e*. *h* is a loose washer against which the coil spring *i* bears. *j* is an adjusting nut and *k* a lock nut. *l* is a lever handle on the inside end of the spindle for turning the spindle and the wiper arm. The wiper element comprises a rubber strip *m* split on its contacting edge to form two prongs and thereby make the strip more flexible.

When the wiper is first assembled upon the windshield panel it assumes somewhat the position shown in Fig. 2, where the toe of the wiping element bears against the glass while the heel of the wiping element is spaced away from the glass. This spacing condition may be more aggravated in some shields and less aggravated in others. In the ordinary windshield wiper no provision is made for these varying conditions. They are made so that the toe will probably bear unusually hard and the heel may hardly contact. No provision is made for getting the proper and a substantially uniform bearing throughout the length of the wiping member. In my wiper this is very easily accomplished after the wiper is mounted, as shown in Fig. 1. The adjusting nut *j* is simply turned down, pushing the sliding key *e* in on the flattened spindle. This carries the pivot *g* in with it, at the same time bringing the heel of the wiping element down against the glass. This adjustment also serves to swing the wiping element upon the pivot *g* against the resistance of the coil spring *i*, thereby bringing this coil spring into play to afford a yielding pressure to keep the rubber strip *m* yieldingly against the glass. The coil spring *i* really performs two functions. It causes the key *e* to keep in contact with the adjusting nut and it further serves the function of tending to turn the wiping element upon the pivot pin *g* to afford a yielding pressure against the glass.

The rubber strip *m* is grooved at *x* on both sides and is held in the channel of the wiper arm.

This article is designed to be adaptable to various classes of windshield panels and the parts are carefully worked out so that practically all the parts are stampings or machined screw products which enables the article to be cheaply manufactured in large quantities.

What I claim is:

1. In a windshield wiper, the combination of a spindle adapted to be rotatably mounted in a windshield panel, a hand lever on one end of the spindle, a key secured to the other end of the spindle in such relation to turn therewith, means for adjusting the key toward and away from the glass, a wiping element pivoted to the key and adapted to swing at an angle to the plane of the panel, and means for yieldingly pressing the outer end of the wiping element toward the glass, the said adjusting of the key on the spindle causing the wiping element to swing upon its pivot to bring the wiping edge into parallelism with the glass.

2. A windshield wiper, comprising a spindle adapted to be rotatably mounted in the windshield panel, a hand lever on one end of the spindle, a sliding key on the other end of the spindle adapted to turn with the spindle, a wiping element pivotally supported by the key to swing in a plane at an angle to the plane of the panel, a spring for engaging between the windshield panel and the inner end of the wiping element to press the outer end of the wiping element yieldingly against the glass, and a nut on the outer end of the spindle for engaging the sliding key to adjustably limit its outward movement, the adjustment of the said nut inwardly upon the spindle serving to bring the heel of the wiping element into contact with the glass when it is disposed to stand away from the glass.

3. A windshield wiper, comprising a spindle adapted to be rotatably mounted in the windshield panel, a hand lever on one end of the spindle, a key on the other end of the spindle adapted to rotate with the spindle, a wiping element pivoted to the key and engaging about the spindle, a coil spring about the spindle for pressing the inner end of the wiping element to yieldingly press the outward end of the wiping element against the glass, and a nut on one end of the spindle for adjusting with the aid of the spring the key toward or away from the glass, whereby the wiping element is caused to swing on its pivot to adjust it to the glass.

4. A windshield wiper, having in combination, a spindle adapted to be rotatably mounted in a windshield panel, a hand lever secured to the inner end of the spindle, a sliding key secured to the outer end of the spindle and adapted to turn therewith, a wiping element pivotally supported upon the key and having a portion of the element engaging around the spindle, a washer adapted to engage with the sliding key and the inner end of the wiping element, a spring between the windshield panel and the washer adapted to give a yielding pressure to oppose the inward movement of the sliding key and also press the outer end of the wiping element yieldingly against the glass, and a nut on the outer end of the spindle for adjusting the sliding key along the spindle and the pivoted wiping element to the glass.

5. A windshield wiper, comprising a spindle adapted to be rotatably supported and provided with a flattened outer end, a bushing for rotatably supporting the spindle in a windshield panel, a hand lever secured to the inner end of the spindle, a key slidably supported on the flattened outer end of the spindle, a wiping element pivoted to the key to swing in a plane at an angle to the plane of the panel and having the inner end adapted to engage about the spindle and key, a spring between the bushing and the inner end of the wiping element and also the inner side of the sliding key, and means on the outer end of the spindle for adjusting the sliding key along the shaft against the pressure of the spring.

In testimony whereof I affix my signature.
LOUIS W. GATES.